United States Patent
Katzman et al.

(10) Patent No.: US 6,178,816 B1
(45) Date of Patent: Jan. 30, 2001

(54) WATER METER

(75) Inventors: Oded Katzman, Dror Dalia; Moshe Dror, Haifa, both of (IL)

(73) Assignee: Arad Dalia, Ltd., Doar Dalia (IL)

( * ) Notice: Under 35 U.S.C. 154(b), the term of this patent shall be extended for 0 days.

(21) Appl. No.: 09/218,586

(22) Filed: Dec. 22, 1998

Related U.S. Application Data

(60) Provisional application No. 60/089,565, filed on Jun. 17, 1998.

(51) Int. Cl.$^7$ .............................. G01F 15/14; F16L 35/00
(52) U.S. Cl. ................... 73/201; 73/273; 285/30
(58) Field of Search ................... 73/201, 272 R, 73/273, 235, 861.93, 861.94; 415/118, 212.1; 138/109; 285/30

(56) References Cited

U.S. PATENT DOCUMENTS

| | | | |
|---|---|---|---|
| 216,360 | 6/1879 | Terry | 73/201 |
| 568,924 | 10/1896 | Rudd et al. | 73/272 R |
| 803,919 | 11/1905 | Merrill | 73/201 |
| 825,707 * | 7/1906 | Eastey | 285/30 |
| 854,882 * | 5/1907 | Gamon | 285/30 |
| 910,514 | 1/1909 | Dilts | 137/625.29 |
| 953,505 | 3/1910 | Bassett | 285/30 |
| 1,631,472 | 6/1927 | Clark | 73/273 |
| 2,153,061 | 4/1939 | Hanks | 73/273 |
| 2,240,223 | 4/1941 | Muselier | 73/201 |
| 2,799,166 * | 7/1957 | Rings | 285/30 |
| 2,881,012 * | 4/1959 | Rings | 285/30 |
| 3,288,494 | 11/1966 | Callahan, Jr. et al. | 285/14 |
| 3,542,403 | 11/1970 | Douglas | 285/30 |
| 3,756,628 * | 9/1973 | Clair | 285/30 |
| 4,391,139 | 7/1983 | Sutherland et al. | 73/273 |
| 4,516,794 | 5/1985 | Zorb et al. | 285/30 |
| 4,549,751 | 10/1985 | Grove, Jr. | 285/30 |
| 4,691,727 | 9/1987 | Zorb et al. | 137/15 |
| 4,819,482 | 4/1989 | Rappart et al. | 73/201 |
| 4,967,788 | 11/1990 | Miller | 73/201 |
| 4,993,260 * | 2/1991 | Bednarz | 73/201 |
| 4,995,643 | 2/1991 | Rappart et al. | 285/4 |
| 5,145,214 | 9/1992 | Hunt | 285/30 |
| 5,150,926 | 9/1992 | Egli | 285/110 |
| 5,568,945 | 10/1996 | Hunt | 285/30 |

* cited by examiner

Primary Examiner—Harshad Patel
(74) Attorney, Agent, or Firm—Webb Ziesenheim Logsdon Orkin & Hanson, P.C.

(57) ABSTRACT

A multiple pipeline orientation water meter that includes a water meter arrangement having a water meter and a pipe connector. The water meter body coacts with the pipe connector to permit proper installation of the water meter in various piping orientations.

39 Claims, 6 Drawing Sheets

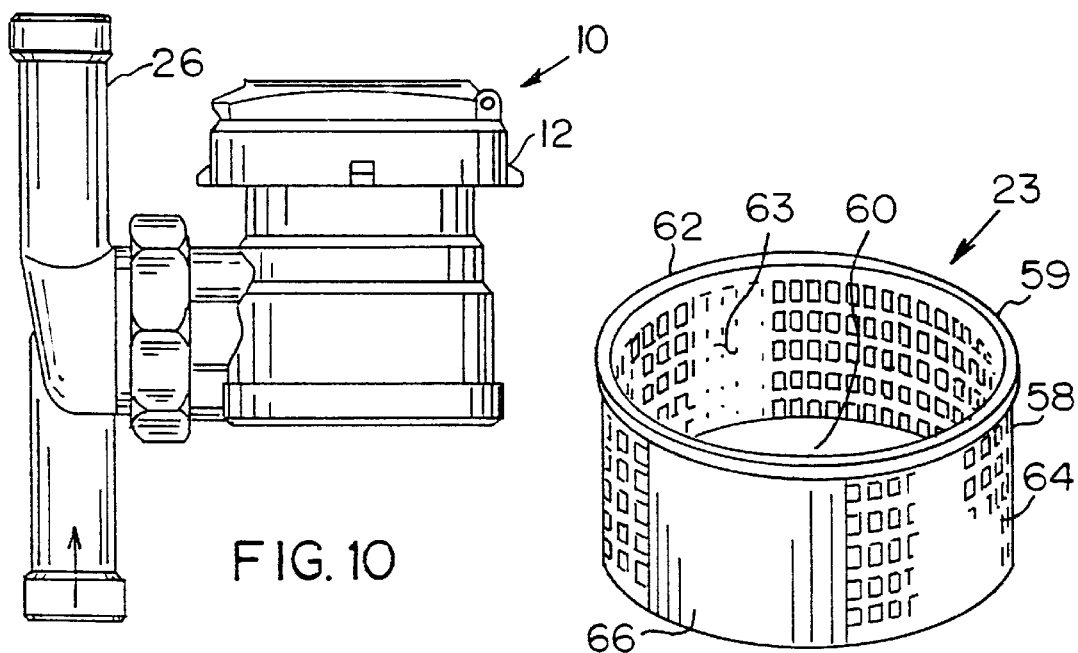
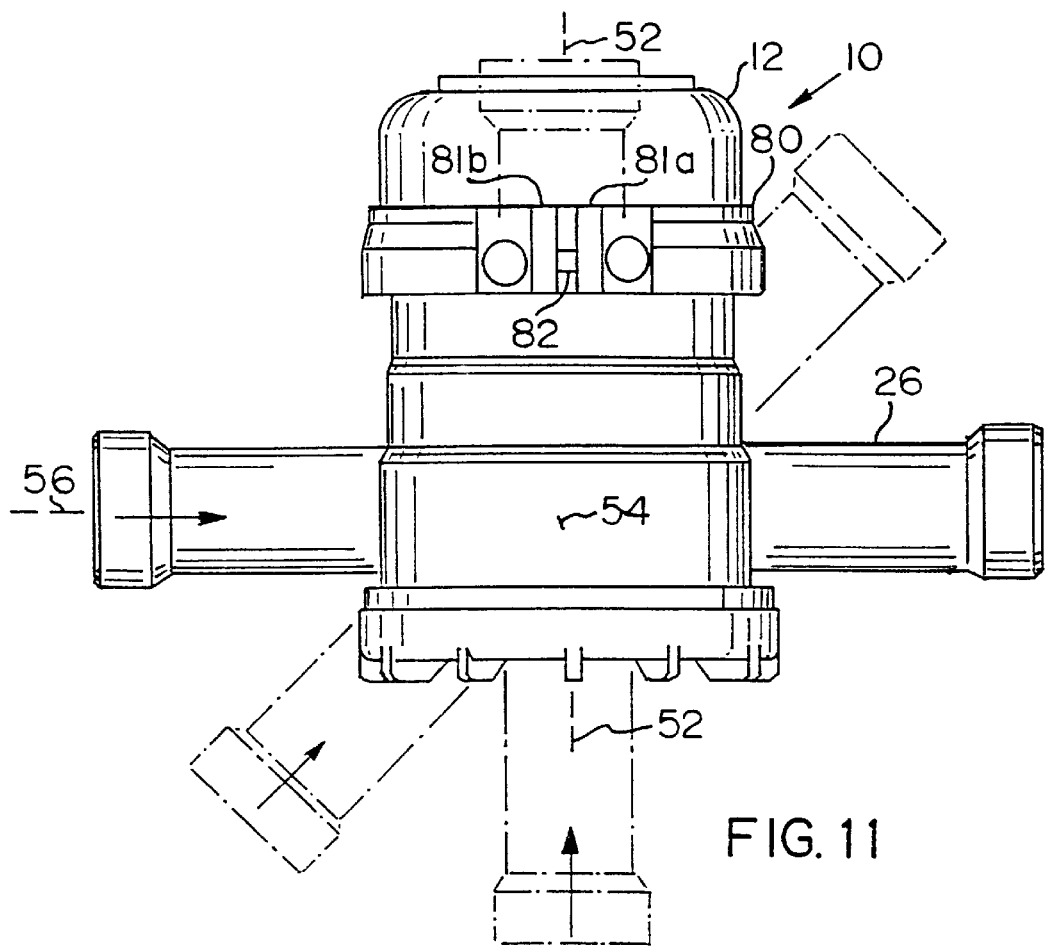

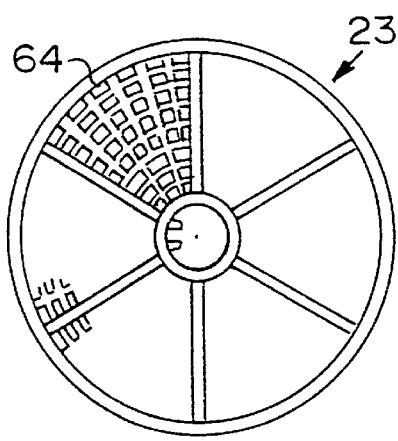
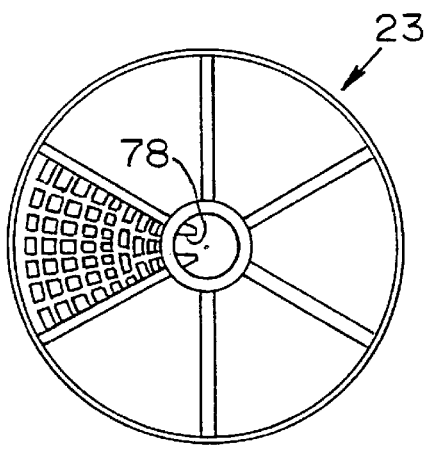
FIG. 13  FIG. 14
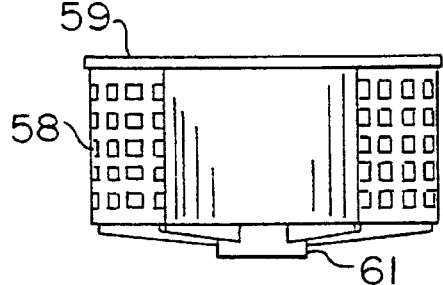
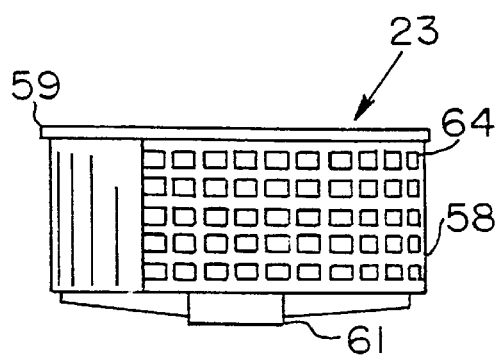
FIG. 15  FIG. 16
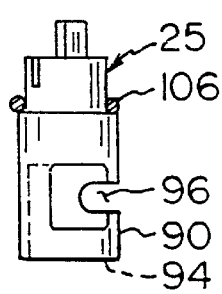
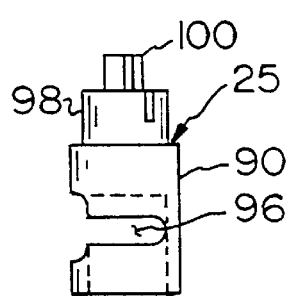
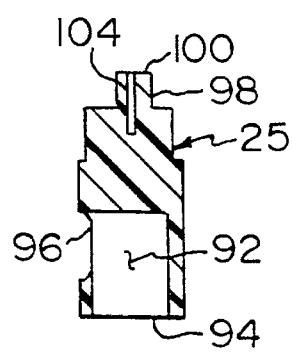
FIG. 17  FIG. 18  FIG. 19
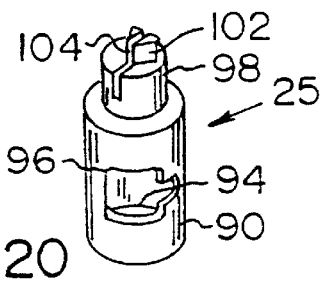
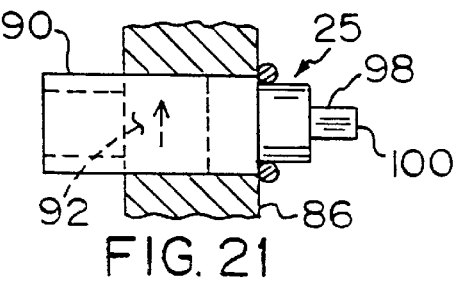
FIG. 20  FIG. 21

WATER METER

CROSS REFERENCE TO RELATED APPLICATION

This application claims the benefit of United States Provisional Application Serial No. 60/089,565, filed Jun. 17, 1998.

BACKGROUND OF THE INVENTION

1. Field of the Invention

The present invention relates to water meters and, more particularly, to connectors used for installing water meters to water lines.

2. Description of the Prior Art

Water meters measure the use of water at a particular installation site. Generally speaking, water meters are used when water is supplied to a site from a central water authority as opposed to being supplied from a well on the site's property. Water meters typically measure the quantity of water used at the site over a period of time. Then, a central water authority can use that measured amount of water to issue a water bill based upon the amount of water used.

Generally, the water meter includes a register, a meter chamber and a meter body. The meter chamber is received in the meter body and the register is coupled to the meter body and the measuring chamber. The measuring chamber can be one of many designs, such as a positive displacement piston-type meter arrangement, a positive displacement disc-type meter arrangement or a multi-jet type turbine meter arrangement. The register typically is positioned vertically above the meter chamber. This orientation is important for adequate operation of the unit including proper lubrication and wear of the moving parts.

Generally, in new facilities, water meters are arranged or properly oriented so that the water meter body is in a horizontal position with the meter register positioned above the meter chamber in a side-by-side vertical relationship. However, in some installations, horizontal placement of the meter is not possible. For example, in industrial installations and particularly in submetering retrofit situations, the water pipe generally extends vertically along studded walls and the water meter may be installed in a vertical position whereby the measuring chamber and the register are in a side-by-side horizontal relationship as opposed to a side-by-side vertical relationship. This results in an improper orientation and lubrication of the water meter. Water meters that are improperly oriented can cause unexpected compound vector loads on either radial journal bearings or anti-friction thrust bearings provided in both the meter measuring chamber and the register. The unexpected loads may shorten a meter's life or affect water flow accuracy. Also, gearing of the register can be adversely affected.

Alternatively, a meter setting device can be used with a water meter so as to properly orient the water meter when coupled to vertically extending pipes. However, the meter setting device is not an option to properly orient the meter when the water lines extend at an angle.

More specifically, in North America, vendors other than water meter manufacturers per se, offer devices called vertical re-setters that permit a standard horizontal axis body water meter to be oriented in a horizontal plane by using either formed copper tubing or cast copper alloy manifolds to redirect water along the horizontal axis of the water meter. In Europe and Asia, it is common to find that water meter manufacturers offer both water meter bodies for horizontal plane installations and vertical set water meters with a major axis following the vertical axis. In either geographical area, there is no provision commonly used to accommodate meters in steeply sloped terrain areas, such as the hilly country of the United States of America in and near the Appalachian chain of mountains in the Mid-South and Northeast or even steeper mountain areas associated with the Rocky Mountains in the North Central or South West of the United States of America. In such areas, conscientious meter installers may attempt to make some accommodations, for example, extra piping may be bent to attempt to correctly orient the meter or flexible piping connections may be provided that can be arranged to set the meter in a horizontal plane. But, more commonly, it is found that the water pipeline through the water meter follows the general terrain at the site.

Therefore, it is an object of the present invention to provide an arrangement to permit the installation of water meters where the water pipelines are provided in various orientations.

SUMMARY OF THE INVENTION

The present invention is a rotatable body/pipe connector that combines the conventional end connections (usually straight pipe threads located on a common axis) and a transition section acting as a fluid manifold in the body/pipe connector. The connector's construction at the pipeline interface permits the entire meter to be connected to a utility pipeline using conventional connections, such as a tailpiece, a nut and an end gasket or to use application-specific end connections, such as sweat fittings, built-in union compression fittings, etc. The manifold body/pipe connector permits a sealed fluid connection to a special meter body transition section via circular shapes which permit the interface to be sealed with standard O-rings that are compressed to make a seal. A large threaded body nut that is mechanically retained on the body/pipe connector by either a spring or split ring provides the sealing force to lock the connections together. The use of the spring or split ring permits the large body nut to be installed over the transition section of the body/pipe connector and still impart a force when engaging the body threads at any angle of the meter body relative to the body/pipe connector. This construction provides two additional advantages: (1) it permits field replacement of pre-calibrated, unitized chamber and register assemblies by unskilled labor; and (2) this same construction permits more flexible upgrades to new technology either in the register or the entire unitized measuring unit.

BRIEF DESCRIPTION OF THE DRAWINGS

FIG. 10 is a side elevational view of the water meter arrangement in a vertical setting;

FIG. 11 is an elevational view of the water meter arrangement in a horizontal arrangement and angled arrangements in phantom;

FIG. 12 is a top perspective view of a filter screen of the water meter shown in FIG. 1;

FIG. 13 is a top plan view of the filter screen shown in FIG. 12;

FIG. 14 is a bottom plan view of the filter screen shown in FIG. 13;

FIG. 15 is an elevational view of the filter screen shown in FIG. 12 in a first orientation;

FIG. 16 is an elevational view of the filter screen shown in FIG. 12 in a second orientation;

FIG. 17 is an elevational view of a bypass of the water meter shown in FIG. 1;

FIG. 18 is an elevational view of the bypass shown in FIG. 17 in another orientation;

FIG. 19 is an elevational-sectional view of the bypass shown in FIG. 18;

FIG. 20 is a perspective view of the bypass shown in FIG. 17;

FIG. 21 is an elevational view, partially in section, of the water meter with the bypass in a first position;

DESCRIPTION OF THE PREFERRED EMBODIMENT

Figure 1:
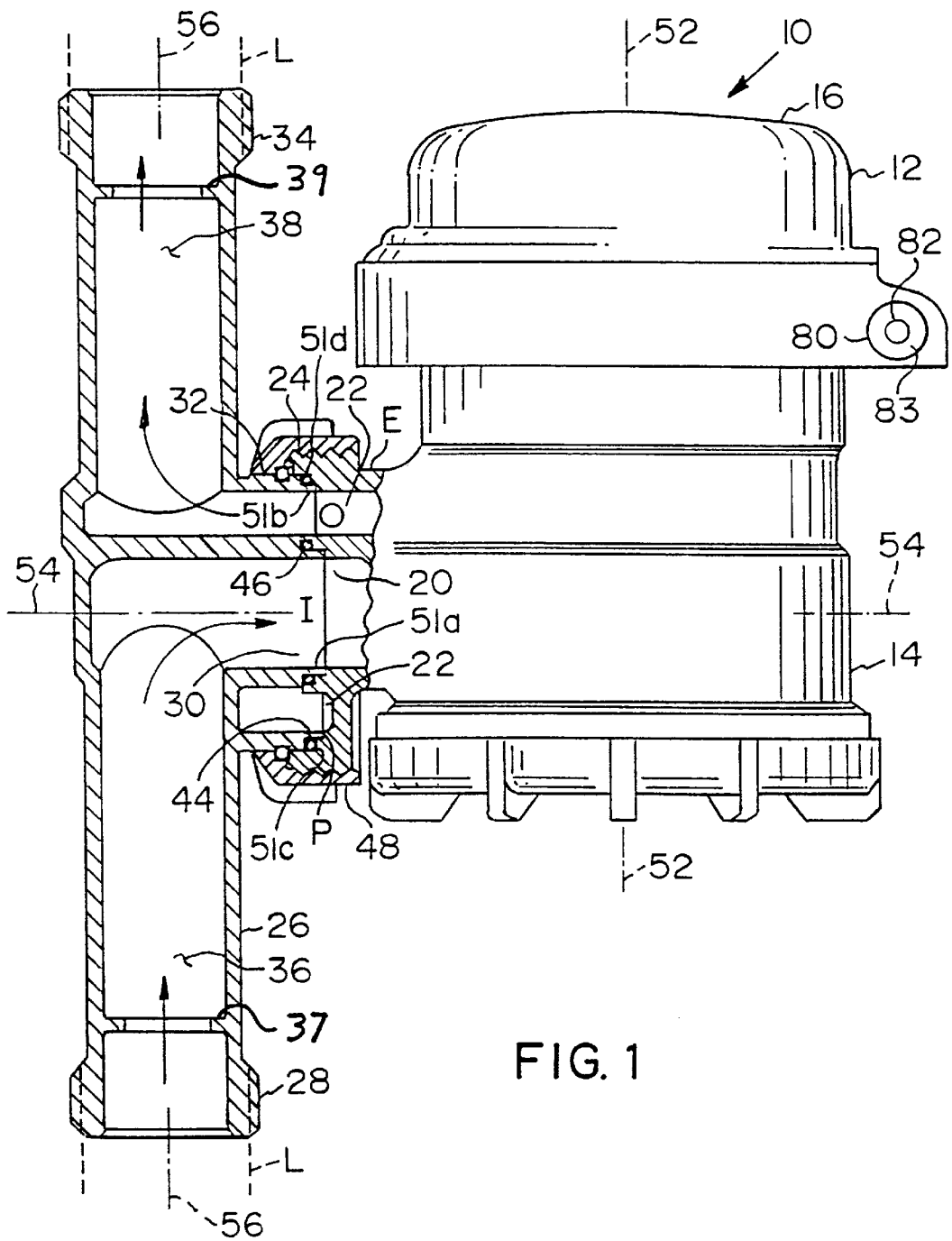
FIG. 1 is an elevational view of a water meter arrangement, partially in section, that includes a water meter coupled to a pipe connector made in accordance with the present invention.
Figure 2:
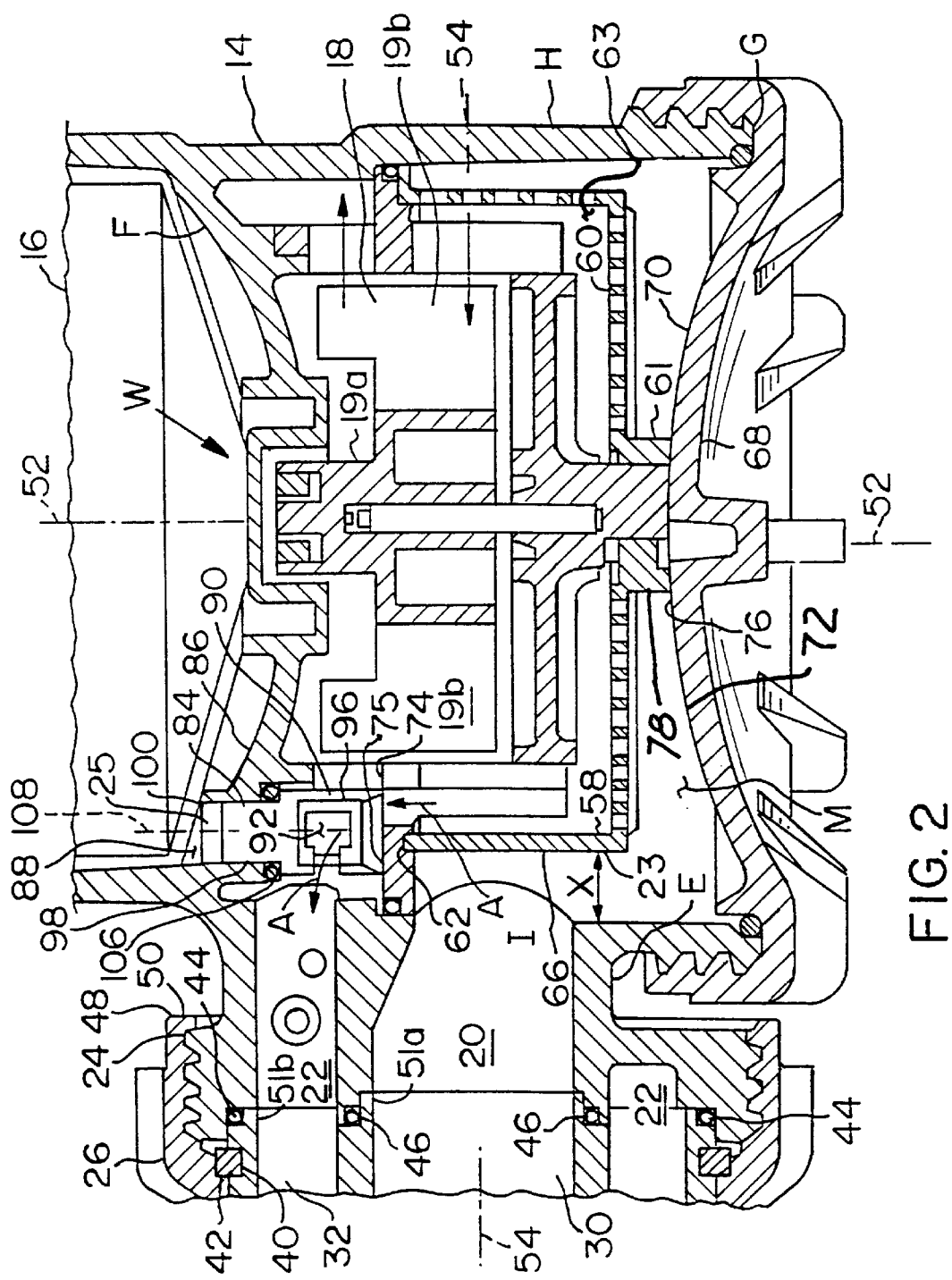
FIG. 2 is an elevational-sectional view of a portion of the water meter and pipe connector shown in FIG. 1.

FIG. 1 shows a water meter or meter arrangement 10 made in accordance with the present invention. The water meter arrangement 10 includes a water meter 12 having a water meter body 14 attached to a water meter register 16. The water meter body 14 can either be casted or molded and made of a metallic material or a polymeric material as is well known in the art. Referring to FIG. 2, a water meter measuring arrangement or fluid measuring element 18 is received within the water meter body 14 in a manner well known in the art. The water meter measuring arrangement 18 is coupled to the water meter register 16. The water meter measuring arrangement 18 can be either a positive displacement meter arrangement, such as a piston or disc-type meter arrangement, or a turbine meter arrangement, such as a single jet or multi-jet meter arrangement. The water meter measuring arrangement 18 can be mechanically coupled to the water meter register 16 or magnetically coupled to the water meter register 16. Magnetic couplings and mechanical couplings are well known in the art. Also, any other manner for coupling the water measuring arrangement 18 to the water meter register 16 can be used. The water meter register 16 is attached to the water meter body 14. FIG. 2 shows the water meter measuring arrangement as a multi-jet meter arrangement that includes a wheel 19a having a plurality of blades 19b secured thereto.

The water meter body 14 includes a water meter chamber inlet 20, which defines an inlet passageway and a water meter chamber outlet 22, which defines an outlet passageway defined in an extension member E. The water meter body 14 also includes a top wall F, a bottom G and a sidewall H. The water meter register 16 is attached to the top wall F. The extension member E extends through the sidewall H of the water meter body 14. The water meter chamber inlet 20 is in fluid communication with an inlet defined in the water meter measuring arrangement 18 and the water meter chamber outlet 22 is in fluid communication with an outlet of the water meter measuring arrangement 18. The water meter measuring arrangement is received by a water meter measuring arrangement cavity M. In operation, water flows through the water meter chamber inlet 20 into the water meter measuring arrangement 18 causing a mechanism to rotate as the water flows through the water meter measuring arrangement 18 and exits the water meter chamber outlet 22. The water passes through a filter screen 23 prior to entering the measuring chamber, so that water passing from the inlet passageway to the outlet passageway passes through the filter screen 23. A threaded end or connection member 24 is defined at the water meter chamber inlet 20 and the water meter chamber outlet 22 of the water meter body 14. A bypass plug valve or bypass 25 communicates with the water meter measuring arrangement 18. The bypass plug valve 25 is cylindrically shaped having a hole passing therethrough. The bypass plug valve 25 is received by the water meter body 14. Rotation of the bypass plug valve 25 about an axis 108 permits water to bypass the water meter measuring arrangement 18, such as the blades 19b and exit the water meter chamber outlet 22 as indicated by the arrows. The bypass plug valve 25 is used for calibrating the water meter 12. The position of the hole can be moved so that it is in the meter chamber cavity.

Figure 3:
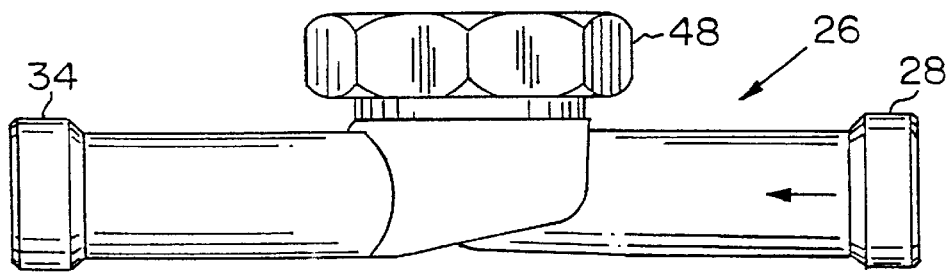
FIG. 3 is an elevational-sectional view showing a pipe connector made in accordance with the present invention.
Figure 4:
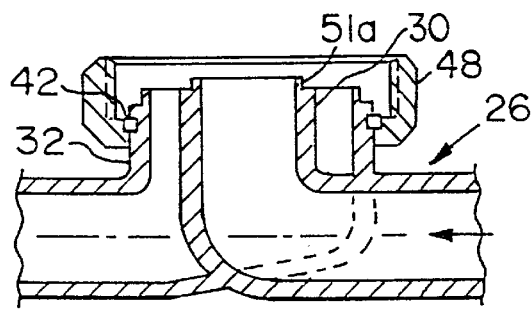
FIG. 4 is an elevational-sectional view of a portion of the pipe connector shown in FIG. 3 with a nut in a first position.
Figure 5:
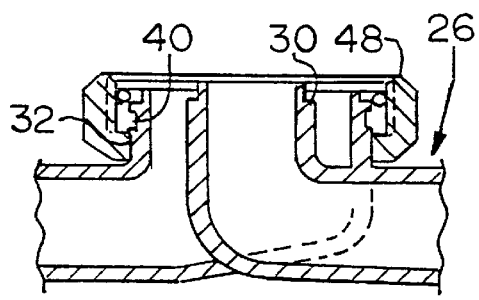
FIG. 5 is an elevational-sectional view of a portion of the connector shown in FIG. 4 with the nut in a second position.
Figures 6, 7A, 7B:
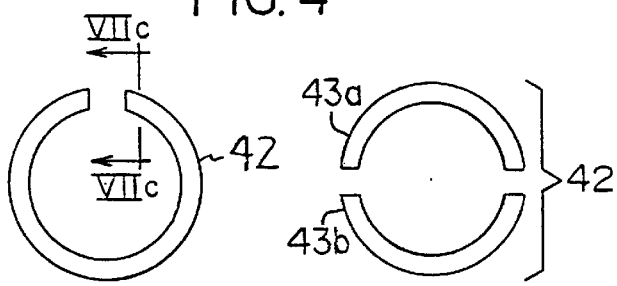
FIG. 6 is a plan view of an annular spring of the pipe connector shown in FIG. 4.
FIG. 7a is an exploded plan view of a split ring of the pipe connector shown in FIG. 4.
FIG. 7b is a plan view of a C-ring of the pipe connector shown in FIG. 4.
Figure 7C:
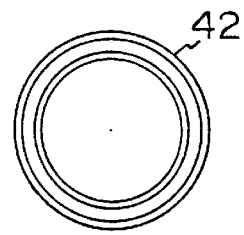
FIG. 7c is a section taken along line VIIc–VIIc of FIG. 7b.

As shown in FIGS. 1 and 2, a pipe connector 26 is secured or attached to the water meter body 14. The pipe connector 26, which is also shown in FIGS. 3–5, includes an inlet-inlet end 28, an inlet-exit end 30, an outlet-inlet end 32, and an outlet-exit end 34, which are adapted to be connected to piping. Preferably, the inlet-inlet end 28 is threaded as is the outlet-exit end 34 to connect the pipe connector 26 to piping, although other types of connections can be used, such as sweat fittings or built-in compression fittings. In the case of sweat fittings, two pipes are received within the inlet-inlet end 28 and the outlet-exit end 34, respectively, and abut lips 37. The pipe connector 26 defines an inlet passageway 36 that includes the inlet-inlet end 28 and the inlet-exit end 30. The pipe connector 26 also includes an outlet passageway 38 that includes the outlet-inlet end 32 and the outlet-exit end 34. The inlet-exit end 30 and the outlet-inlet 32 define a meter body connection end 39. The inlet-exit end 30 defines a first portion of the meter body connection end 39 and the outlet-inlet end 32 defines a second portion of the meter body connection end 39. The inlet passageway 36 is in fluid communication with the water meter chamber inlet 20 and the outlet passageway 38 is in fluid communication with the water meter chamber outlet 22. A ring recess or groove 40 is defined at the outlet-inlet end 32 for receipt of a retainer 42, such as a circular spring as shown in FIG. 6. Alternatively, the retainer 42 can be a split ring, as shown in FIG. 7a, which is received in the recess 40. In the case of the retainer 42 being the spring, the diameter of the recess 40 is greater than the relaxed diameter of the spring. When the retainer 42 is the split ring, it is made of two sections 43a and 43b of 180° each that are received within the recess 40 forming a 360° ring. Preferably, the spring or split ring retainer 42 is made of metal, although it can be made of non-metallic material. Preferably, the retainer 42 is a C-shaped ring as shown in FIG. 7b having a square cross-section as shown in FIG. 7c. Alternatively, the retainer can have a circular cross-section or other shape.

A nut or securement member 48 secures the pipe connector 26 to the threaded end 24 of the water meter 12. Specifically, the nut 48 includes inner threads that coact with the threaded end 24 and a back wall that coacts with the retainer 42. Seals 44 and 46, such as gaskets or O-rings, are provided to be sandwiched and to contact respective end surfaces near the end of the water meter chamber inlet 20, the water meter chamber outlet 22, the inlet-exit end 30 and the outlet-inlet end 32 as shown in FIG. 1. Preferably seals 44 and 46 have a square cross-section, although the cross-section can be any shape. The nut 48 is rotatably secured to the pipe connector 26 adjacent the inlet-exit end 30 and the outlet-inlet end 32 and is adapted to secure the pipe connector 26 to the threaded end 24 of the water meter body 14. A centering annular lip 50 may also be provided on the threaded end 24 to receive an outer surface of the outlet-inlet end 32 for aligning the pipe connector 26 with the threaded end 24. Also, lips 51a and 51b may be provided on the connector to assure proper alignment of the pipe connector 26 with the water meter body 14. The lips 51a and 51b are received by respective sections of the threaded end 24 of the meter body 14 for easy alignment. Respective seals 44 and 46 are captured between the lips 51a and 51b and walls 51c and 51d of the water meter body 14. Alternatively, lips 51a and 51b can be provided on the meter body 14 and walls 51c and 51d can be provided at the connector 26. As shown in FIG. 4, the retainer 42, which is a spring or split ring, is in the normal engaged position and received in the recess 40 and a recess defined by the nut 48. FIG. 5 shows the retainer 42 as a spring prior to it being expanded and received by the recess 40.

Figure 8:
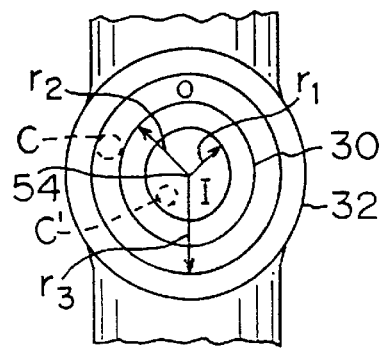
FIG. 8 is a plan view a portion of the pipe connector shown in FIG. 4.
Figure 9:
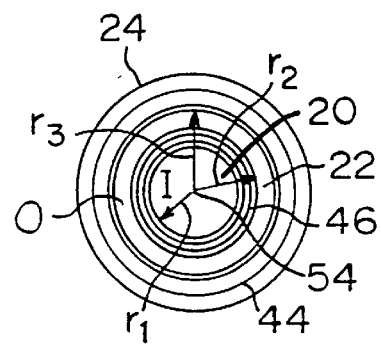
FIG. 9 is a plan view of a portion of a body of the water meter shown in FIG. 1.

As can be seen in FIG. 8, the inlet-exit end 30 has a circular shape and defines a circular passageway. The outlet-inlet end 32 is likewise circular in shape and defines an annular exit passageway. Likewise as shown in FIG. 9, the water meter chamber inlet 20 is circular in shape and defines a circular passageway and the water meter chamber outlet 22 is circular in shape and defines an annular passageway. The inlet-exit end 30 aligns with the water meter chamber inlet 20 and is in fluid communication therewith. Likewise, the outlet-inlet end 32 aligns with the water meter chamber outlet 22 and is in fluid communication therewith. Seals 44 and 46 prevent leakages from and between an inlet passage I and an outlet passage O defined at the interface of the threaded end 24 and the pipe connector 26, as shown in FIG. 2.

The nut 48, which can be made from plastic or metal, can have a multi-sided outer surface as shown in FIG. 3. The nut 48 can also have a circular outer surface with a plurality of radially extending protrusions. This can provide for an arrangement for tightening the nut 48 to the threaded end 24 of the water meter body 14 by use of a wrench. Referring back to FIGS. 1 and 2, a vertical axis 52 is defined. The vertical axis 52 passes through the water meter register 16 and the water meter measuring arrangement 18 when the water meter is properly installed. A horizontal axis 54, which is transverse to the axis 52, extends through the water meter body 14 and extends through the threaded end 24. Specifically, the threaded end 24 is coaxial about the axis 54 and both the water meter chamber inlet 20 and the water meter chamber outlet 22 are coaxial about and extend along the axis 54 at a plane P as shown in FIG. 1, as well as being coaxial with each other. Also, the inlet-exit end 30 and the outlet-inlet end 32 are coaxial about the axis 54 at plane P. Plane P is also normal to the axis 54. A third axis 56 passes through the pipe connector 26 and is transverse to the axis 54 and intersects axis 54. Axis 56 is an orientation axis.

Installation of the water meter arrangement 10 is described as follows. Initially, the pipe connector 26 is attached to a water line shown, in phantom, in FIG. 1 and designated L. This can be done through a nut and gasket arrangement which is well known in the art or any other arrangement known in the art. The water meter 12 is then secured to the pipe connector 26 by threadably securing the nut 48 to the threaded end 24 of the meter body 14. The inlet-exit end 30 aligns with the water meter chamber inlet 20 and the outlet-inlet 32 aligns with the water meter chamber outlet 22. The water meter 12 is then rotated relative to the pipe connector 26 about the axis 54 until the water meter register 16 is positioned vertically above the water meter measuring arrangement 18 shown in FIGS. 1 and 10. At that time, the nut 48 is tightened so that a watertight arrangement is formed between the nut 48, the seals 44 and 46, the water meter body 14 and the pipe connector 26. The retainer 42 abuts against an inner surface of the nut 48 when the nut 48 is tightened and retains the nut 48 on the pipe connector 26 and prevents the nut 48 from being pulled off.

In some arrangements, the axis 56 will be parallel to the axis 52, such as shown in FIGS. 1 and 10. In other applications, the axis 56 will be transverse to the axis 52 as shown in FIG. 11. In yet other applications, axis 56 is angled with respect to axis 52 as shown in phantom in FIG. 11. Hence, the present invention permits a water meter to be properly installed in various water meter piping arrangements and various piping orientations quickly and inexpensively by an unskilled laborer. Specifically, the water meter body 14 can be rotated about the axis relative to the pipe connector 26 and the meter inlet passageway and the meter outlet passageway remain aligned with the inlet-exit end 30 and the outlet-inlet end 32.

The present invention provides for easy assembly of the pipe connector 26 through the use of the nut 48 and the retainer 42. Easy alignment is achieved through the arrangement of the interfacing of the pipe connector 26 and the threaded end 24.

As shown in FIG. 8, the inlet I of the pipe connector 26 is defined by a circle having a radius $r_1$ extending from axis 54. The outlet O is defined by an annular portion coaxial with axis 54 and defined by $r_2$ and $r_3$.

FIG. 9 shows the threaded end 24, where inlet I is defined by a circle having a radius $r_1$ and outlet O is defined by an annular portion defined by radii $r_2$ and $r_3$ where radii $r_1$, $r_2$, $r_3$ extend from axis 54. Although FIGS. 8 and 9 show the inlet I surrounded by outlet O, the arrangement can be reversed. Also, one of the annular portions can be replaced with another shape, such as a circle or a portion of an annulus as shown, in phantom, as C in FIG. 8. Likewise, one of the circular portions can be replaced with another shape, such as the circle or a portion of an annulus C' shown in FIG. 8. Then, the alternative portion C is contained totally in an envelope defined by a ring having radii $r_2$ and $r_3$ and the alternative portion C' is contained within a circle having a radius $r_1$. Alternatively, one or both of C and C' can be provided on the threaded end 24 which will fluidly communicate with a respective circular inlet I having a radius $r_1$ or the annular outlet 0 having radii $r_2$ and $r_3$ of the pipe connector 26.

FIGS. 12–16 show the filter screen 23 in more detail. The filter screen 23 includes a cylindrically shaped sidewall 58 having an upper edge 59 and a base 60, which is substantially planar and circular shaped. A projection or filter screen projection 61 extends from the base 60. The base 60 is attached to a lower end of the sidewall 58. The sidewall 58 and the base 60 define an open ended, screened cup-shaped profile 62 and a measuring chamber body recess 63. Perforations 64 are defined throughout the filter screen 23 except for a solid portion 66 defined on the sidewall 58. The filter screen 23 receives a measuring chamber body 74 and the water meter measuring arrangement 18. The measuring arrangement includes the wheel 19a and blades 19b arrangement, which are received within the measuring chamber body 74. The measuring chamber body recess 63 receives the measuring chamber body 74. The filter screen 23, the water meter measuring arrangement 18 and the measuring chamber body 74 define a water meter measuring chamber W. The solid portion 66 is arranged within the water meter body 14 so that it faces the water meter chamber inlet 20. Referring back to FIG. 2, the filter screen 23 is spaced a distance "X" away from the water meter body wall to permit water to flow around the solid portion 66. The water then passes through the perforations 64 defined in the sidewall 58 and the base 60. The filter screen 23 is also received within the water meter body 14 so that a threaded plate 68 is positioned adjacent the base 60. The threaded plate 68 and the water meter register 16 are spaced apart from each other along the vertical axis 52, which extends through the water meter measuring arrangement cavity M. The threaded plate 68 is attached to the bottom G of the meter body 14. The water meter measuring chamber W is positioned between the top wall F and the threaded plate 68. The threaded plate 68, typically known as a pressure plate, includes an inner surface 70 having a convex shaped portion 72. The inner surface 70 forms part of the water meter measuring arrangement cavity M. As stated previously, the measuring chamber body 74 is received within the filter screen 23 and the wheel 19a/blade 19b arrangement is rotatably received by the measuring chamber body 74. The threaded plate 68 is threadably engaged with and tightened within the water meter body 14 until the projection 61 contacts an apex portion 76 of the inner surface 70 of the threaded plate 68. Axial forces are passed through the filter screen 23 via the sidewall 58 to a lip 75 defined on the measuring chamber body 74. Hence, rotating the threaded plate 68 adjusts a sealing force applied to the filter screen 23 and the measuring chamber body 74. This causes the measuring chamber body 74 to be urged in a sealing relationship with the water meter body 14 by the upper edge 59 of the sidewall 58 of the filter screen 23 abutting against the lip 75 and the threaded plate 68 co-acting with the projection 61. This arrangement prevents distortion of the measuring chamber body 74 and eliminates any axial forces caused by tightening against the wheel/blade arrangement, which could cause jamming or excessive friction of the water meter measuring arrangement 18. The filter screen 23 includes an alignment projection 78 for properly aligning the filter screen 23 with the measuring chamber body 74.

Referring to FIGS. 1 and 11, the water meter register 16 is secured to the water meter body 14 through a split C-ring 80. The split C-ring includes two ends 81a and 81b. A threaded screw 82 passes through holes defined in ends 81a and 81b and is held in place by a threaded nut 83, thereby securing the ends 81a and 81b to each other. A tamper resistant cover is placed over the head of the screws.

Alternatively, a pin can replace the screw 82 and a lock washer can replace the nut 83. In this case, the water meter register 16 can only be removed from the water meter body 14 by breaking the pin 82 or forcing the pin 82 from the ends of the split C-ring 80. Preferably, the pin 82 is made of plastic and has a coating configured to crack or score if tampered with. Preferably, the coating is of a phosphorescent color.

Referring back to FIG. 2, the bypass plug or bypass 25 is provided to calibrate the water meter 12 by diverting a portion of the water flowing from the inlet passageway from the water meter chamber directly to the outlet passageway as shown by arrows A, prior to the water passing through the turbine wheel. The bypass 25 extends through a bypass hole 84 defined in the top wall F of the water meter body 14. A portion of the bypass plug 25 extends into a space 88 defined between the water meter register 16 and an upper surface of the top wall 86 of the water meter body 14. A lower portion of the bypass 25 extends into the water meter measuring chamber body 74, and aligns with the water meter chamber body 74 and the filter screen 23 with the water meter body 14.

Referring to FIGS. 17–20, the bypass 25 includes a bypass body 90 that defines a bypass passageway 92. The bypass passageway 92 includes a bottom opening 94 and side openings 96 in fluid communication with the bypass passageway 92. A shaft 98 extends from the bypass body 90 through the top wall F and includes an upper surface 100 having indicia 102, such as an arrow, formed thereon. A slot for adjustment 104 is defined on the shaft 98. An O-ring seal 106 is received on the shaft 98 and, as shown in FIG. 2, is sandwiched between the shaft 98, the body 90 and a lower surface of the top wall 86 of the meter body 14. The bypass 25 can be rotated about a longitudinal axis 108. Rotation of the bypass 25 relative to the top wall 86 of the water meter body 14 causes the side openings 96 to rotate relative to the water meter body 14. In this manner, the bypass body 90 is sealingly and movingly engaged within the water meter body 14.

As shown in FIGS. 21–24, the orientation of the bypass body 90 causes portions of the side openings 96 to be blocked by the water meter body 14. This blockage affects the bypass flow rate, which flows through the bypass passageway 92. The orientation of the side openings 96 can be determined through the orientation of the indicia 102. In other words, the indicia 102 identifies the position of the side opening 96. The orientation of the bypass body 90 can be changed by placing an adjustment head, such as a screwdriver head, into the slot for adjustment 104 and rotating the shaft 98 and the side openings 96 about the longitudinal axis 108. Once the bypass 25 is properly oriented, then the water meter register 16 can be secured to the water meter body 14 by the split C-ring 80 and screw 82. The water meter register 16 is positioned about the upper surface 100, thereby preventing access to and, in turn, movement of the shaft 98 when the register is attached to the water meter body 14. The O-ring seal 106 prevents water from passing from the water meter measuring chamber to the space 88 between the register and the upper wall. In this arrangement, the water meter 12 can be calibrated after the water meter has been completely assembled without the water meter register. The orientation of the bypass body 90, i.e., the side openings 96, relative to the top wall 86, affects the amount of water that can bypass the water meter measuring arrangement 18. Also, this arrangement permits for easy recalibration of the meter. Typically, the bypass 25 permits for up to 4% of the water to bypass the water meter turbine.

Figure 26:
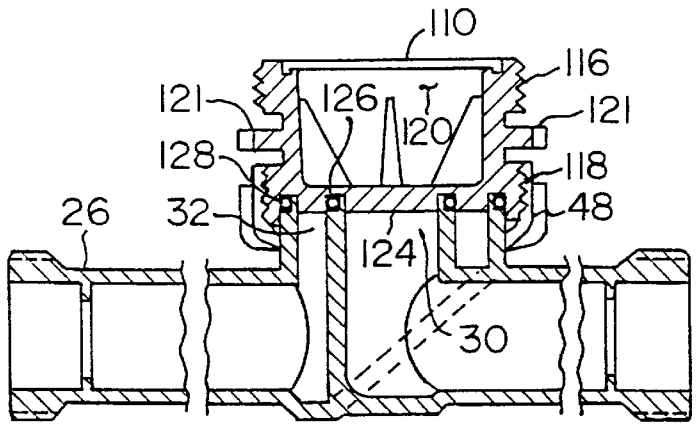
FIG. 26 is an elevational-sectional view of the pipe connector shown in FIG. 25 with the reversible plug in a sealing position.

In some situations, the water meter 12 may be removed after operation, such as in apartments or homes after a resident moves out of the residence. In other situations, a meter may not initially be attached to the pipe connector 26, such as in new construction. In new construction, the American Water Works Association standards (AWWA) requires that the water lines be flushed for three (3) days. After that period of time, the resident, i.e., tenant may not initially move into the residence and, therefore, a water meter may not be initially attached to the pipe connector 26. In those situations, a cap or two position plug 110 is provided as shown in FIGS. 25 and 26.

The cap 110 includes a body 111 having a first portion 112 and a second portion 114. Exterior threads 116 and 118 are provided on the first portion 112 and second portion 114. The threads 116 and 118 are adapted to be threadably received by the nut 48 positioned on the pipe connector 26. The first portion 112 defines a recessed passageway 120 having a plurality of fins extending therein. The second portion 114 defines a sealing surface 124, which is positioned opposite the recessed passageway 120.

Figure 25:
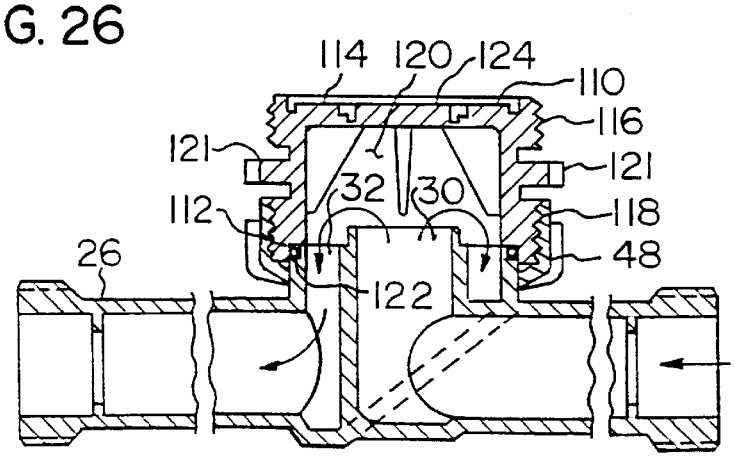
FIG. 25 is an elevational-sectional view of the pipe connector shown in FIG. 3, receiving a reversible plug in flushing position.

In operation, where a water line is to be flushed, the first portion 112 of the cap 110 is threadably engaged with the nut 48 of the pipe connector 26 in a first position, as shown in FIG. 25. Tabs 121 are provided for engagement with a tool, such as a wrench, for tightening and loosening of the cap. An O-ring 122 is sandwiched between the outlet-exit end 34 and an end of the first portion 112. The recessed passageway 120 is arranged so that the pipe connector inlet passageway 36, the recessed passageway 120 and pipe connector outlet passageway 38 are in fluid communication with each other. The recessed passageway 120 can vary in size depending on the permissible flow rate through the pipe connector 26. In some instances, the flow rate could be reduced to a very low flow rate, say to one (1) to two (2) gallons per minute, in situations where water is to always flow at low flow rates through the pipe connector. FIG. 26 shows the cap 110 in a second position, which prevents the flow of water through the pipe connector 26. In this arrangement, the threads 118 of the second portion 114 threadably engage with the nut 48 of the pipe connector 26 until the cap 110 abuts against the inlet-exit end 30 and the outlet-inlet end 32. O-rings 126 and 128 are provided for fluid seals and are sandwiched between the sealing surface 124 and the inlet-exit end 30 and outlet-inlet end 32. Alternatively, flat gaskets can be used in view of the O-rings 126 and 128. In this arrangement, one cap can be provided to permit flow through the pipe coupling or prevent flow through the pipe coupling, depending upon the orientation of the cap 110.

Figure 27:
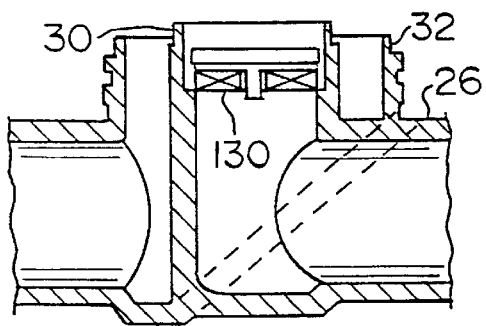
FIG. 27 is an elevational-sectional view of a portion of the pipe connector shown in FIG. 3 with a check valve.
Figure 22:
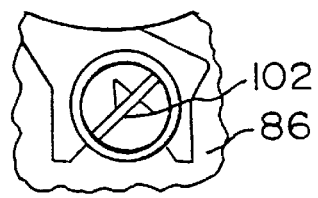
FIG. 22 is a top plan view of the portion of the water meter shown in FIG. 21.
Figure 23:
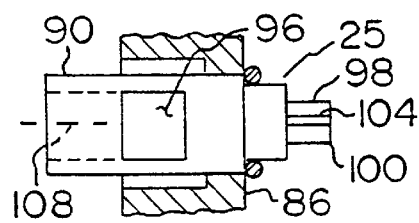
FIG. 23 is an elevational view, partially in section, of the water meter with the bypass in a second position.
Figure 24:
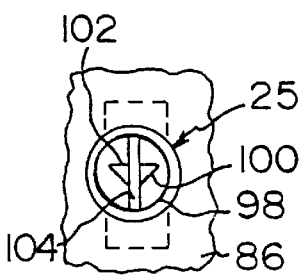
FIG. 24 is a top plan view of the portion of the water meter shown in FIG. 23.

In an alternative embodiment, a check valve receiving recess can be defined in the inlet-exit end 30 of the pipe connector 26, as shown in FIG. 27. The check valve 130 is received by the recess and prevents water from flowing in a reverse direction through the pipe connector. Check valves are well known in the art. The check valve is then positioned upstream of the inlet passageway 36 of the meter body 14. The check valve 130 essentially prevents backflow situations that can occur in the pipe connector 26.

It is believed that the present invention can be used in applications other than water meters, such as for gas meters and other liquid meters. Also, it is believed that the pipe connector 26 can be used with pressure vessels other than meter bodies.

Having described the presently preferred embodiment of the invention, it is to be understood that it may be otherwise embodied within the scope of the appended claims.

What is claimed:

1. A meter comprising:
 a meter body defining an inlet passageway, an outlet passageway and a measuring chamber cavity;
 a fluid measuring chamber received within the measuring chamber cavity in fluid communication with the inlet passageway and the outlet passageway;
 a fluid measuring register attached to said body and coupled to said measuring chamber; and
 a plate secured to said body, said plate having a surface that defines a portion of the measuring chamber cavity, wherein said fluid measuring chamber comprises a fluid measuring element, said meter further comprising a bypass received by said meter body wherein said bypass includes a bypass body sealingly and movably engaged within said meter body, said bypass body defining a bypass passageway, said measuring element adapted to coact with fluid flowing from the inlet passageway to the outlet passageway, and said bypass adapted to direct a portion of said fluid flowing from the inlet passageway to bypass said measuring element and flow directly to the outlet passageway.

2. A meter as claimed in claim 1, wherein said plate and said fluid measuring register are spaced apart from each other along a first axis, that extends through the measuring chamber cavity, and the inlet passageway and the outlet passageway extend along a second axis transverse to the first axis.

3. A meter as claimed in claim 2, wherein said meter body includes a top wall, a bottom and a sidewall, wherein said fluid measuring register is attached to said top wall of said meter body, said plate is attached to said bottom of said meter body and the inlet passageway and the outlet passageway extend through said sidewall of said meter body.

4. A meter as claimed in claim 3, wherein said meter body comprises an inlet and an outlet extending from said sidewall of said meter body, wherein said inlet defines the inlet passageway and said outlet defines the outlet passageway.

5. A meter as claimed in claim 4, wherein one of said inlet and said outlet is coaxial about the other of said inlet and said outlet.

6. A meter as claimed in claim 5, wherein said inlet and said outlet are defined by an extension member extending from said sidewall of said meter body.

7. A meter as claimed in claim 6, further comprising a connection member defined on said extension member.

8. A meter as claimed in claim 7, wherein said connection member is defined by a threaded end.

9. A meter as claimed in claim 1, wherein said fluid measuring chamber comprises a measuring chamber body having a measuring chamber inlet and a measuring chamber outlet, a wheel having a plurality of blades rotatably secured thereto, and a filter screen receiving said measuring chamber body.

10. A meter as claimed in claim 9, wherein said filter screen includes a filter screen sidewall and a filter screen base defining a measuring chamber body recess, which receives said measuring chamber body and wheel, whereby fluid passing from the inlet passageway to the outlet passageway must pass through said filter screen.

11. A meter as claimed in claim 10, wherein said filter screen sidewall is cylindrically shaped and said filter screen base is substantially planar and circular shaped and connected to said filter screen sidewall, thereby defining a screened open ended cup.

12. A meter as claimed in claim 10, wherein said filter screen defines a screened open ended cup, said filter screen sidewall having an upper edge and said filter screen base defining a filter screen projection, whereby said filter screen projection rests on an inner surface of said plate and said chamber measuring body is urged into a sealing relationship with said meter body by said upper edge of said sidewall abutting against said measuring chamber body and said plate coacting with said projection.

13. A meter as claimed in claim 12, wherein said inner surface of said plate has a convex shape portion, having an apex and said filter screen projection abuts against said apex of said plate.

14. A meter as claimed in claim 13, wherein said plate is threadably engaged with said meter body, whereby rotation of said plate adjusts a sealing force applied to said filter screen and said measuring chamber body.

15. A meter as claimed in claim 1, wherein said measuring element is one of a wheeled member having one or more blades or a positive displacement meter.

16. A meter as claimed in claim 1, wherein said meter body includes a top wall spaced from said plate, with said measuring element positioned between said top wall and said plate, wherein said bypass body includes a shaft extending through said top wall and said bypass body defines a bypass passageway opening in fluid communication with the bypass passageway whereby moving said shaft relative to said top wall adjusts the bypass passageway opening which affects the amount of fluid that can bypass said measuring element.

17. A meter as claimed in claim 16, wherein said shaft includes an upper surface, whereby said register is positioned over said upper surface, thereby preventing movement of said shaft when said register is attached to said meter body.

18. A meter as claimed in claim 17, wherein said register is magnetically coupled with said measuring element.

19. A meter as claimed in claim 16, wherein said bypass is sealingly engaged through a seal received on said shaft and positioned between said shaft and said top wall.

20. A meter as claimed in claim 19, wherein said shaft includes an upper surface of said upper surface includes indicia identifying a position of the bypass passageway opening and means for adjusting the position of the bypass passageway opening.

21. A meter as claimed in claim 1, wherein said fluid measuring register is secured to said meter body through a split ring having two ends secured by a fastener.

22. A meter as claimed in claim 1, further comprising a pipe connector attached to said meter body, said pipe connector having an inlet end and an outlet end, said inlet end and said outlet end adapted to be connected to piping and said pipe connector having a meter body connecting end with a pipe connector first portion and a pipe connector second portion, said first portion aligned with the inlet passageway of said meter body so that said pipe connector first portion is in fluid communication with the meter inlet passageway of said meter body and said pipe connector second portion aligned with the outlet passageway of said meter body, whereby said meter body can be rotated about an axis relative to said pipe connector and the inlet passageway of said meter body and the outlet passageway of said meter body remain aligned with said pipe connector first portion and said pipe connector second portion.

23. A meter as claimed in claim 22, wherein said pipe connector is threadably secured to said meter body.

24. A meter as claimed in claim 23, wherein said pipe connector is threadably secured to said meter body through a threaded nut.

25. A meter as claimed in claim 22, wherein said plate and said fluid measuring register are spaced apart from each other along a first axis, that extends through the measuring chamber cavity and the inlet passageway and the outlet passageway extend along a second axis transverse to the first axis, and said meter body includes a top wall, a bottom and a sidewall, an inlet and an outlet, said top wall attached to said sidewall and said sidewall including said bottom, wherein said fluid measuring register is attached to said top wall of said meter body, said plate is attached to said bottom of said meter body, said inlet and said outlet extending from said side of said meter body, wherein said inlet defines the inlet passageway and said outlet defines the outlet passageway, one of said inlet and said outlet is coaxial about the other of said inlet and said outlet.

26. A meter as claimed in claim 25, wherein said inlet and said outlet are defined by an extension member extending from said side of said meter body, said extension member having a threaded connection member defined on an end thereof.

27. A pipe connector for use in a water line for a meter having a meter body defining an inlet passageway, an outlet passageway and a measuring chamber cavity, a fluid measuring chamber received within the measuring chamber cavity in fluid communication with the inlet passageway and the outlet passageway, a fluid measuring register attached to the body and coupled to the measuring chamber, and a plate secured to the body, the plate having a surface that defines a portion of the measuring chamber cavity, wherein the meter body includes a meter inlet and a meter outlet extending from a sidewall of the meter body, the meter inlet and the meter outlet are defined by an extension member extending from the side of the meter body, one of the meter inlet and the meter outlet radially spaced about the other of the meter inlet and the meter outlet, and a threaded connection member defined on an end of the extension member, said pipe connector comprising:

a pipe connector body having a pipe connector inlet passageway and a pipe connector outlet passageway, said pipe connector having an inlet end and an outlet end, said inlet end and said outlet end adapted to be connected to piping and said pipe connector having a meter body connecting end adapted to removably connect to the threaded connection member, said meter body connecting end having a pipe connector first portion and a pipe connector second portion, said pipe connector first portion adapted to be aligned with the inlet passageway of the meter body so that said pipe connector first portion is adapted to be in fluid communication with the inlet passageway of the meter body while said second portion is adapted to be aligned with the outlet passageway of the meter body, so that the meter body can be rotated about an axis relative to said pipe connector and the inlet passageway of the meter body and the outlet passageway of the meter body remain aligned with said pipe connector first portion and said pipe connector second portion, and a two position plug threadably coacting with said connecting end, said plug having a plug body with a plug first portion and a plug second portion, said plug first portion defining a recessed flow passage and said plug second portion defining a sealing surface, when said plug first portion of said plug body coacts with said connecting end in the first position, said plug first portion recessed flow passage is in fluid communication with said pipe connector inlet passageway and said pipe connector outlet passageway and when said plus second portion of said plug body coacts with said connecting end in the second position, said sealing surface engages with said connector first portion and said connector second portion to fluidly seal said pipe connector inlet passageway from said pipe connector outlet passageway.

28. A pipe connector as claimed in claim 27, further comprising a securement member rotatably secured to said pipe connector adjacent said connector first portion and said securement member is adapted to secure said pipe connector body to the threaded connection member of the meter body wherein said plug body defines threads to threadably engage with said securement member.

29. A pipe connector as claimed in claim 28, wherein said securement member is threaded.

30. A pipe connector as claimed in claim 29, wherein said securement member is a nut.

31. A pipe connector as claimed in claim 28, wherein said securement member is secured to said pipe connector body by a retainer secured to said pipe connector body.

32. A pipe connector as claimed in claim 31, wherein said retainer is one of a split ring or a C-shaped ring.

33. A pipe connector as claimed in claim 31, wherein said retainer is a spring.

34. A pipe connector as claimed in claim 27, comprising means for aligning said meter body connecting end with the meter body.

35. A pipe connector as claimed in claim 27, further comprising a check valve positioned in one of the pipe connector inlet passageway and the pipe connector outlet passageway.

36. A meter comprising:
- a meter body defining an inlet passageway, an outlet passageway, and a measuring chamber cavity;
- a fluid measuring chamber received within the measuring chamber cavity in fluid communication with the inlet passageway and the outlet passageway;
- a fluid measuring register attached to said body and coupled to said measuring chamber;
- a plate secured to said body, said plate having a surface that defines a portion of the measuring chamber cavity, wherein said plate and said fluid measuring register are spaced apart from each other along a first axis, that extends through the measuring chamber cavity, and the inlet passageway and the outlet passageway extend along a second axis transverse to the first axis, and wherein said meter body includes a top wall, a bottom, and a sidewall, wherein said fluid measuring register is attached to said top wall of said meter body, said plate is attached to said bottom of said meter body and the inlet passageway and the outlet passageway extend through said sidewall of said meter body;
- and wherein said meter body comprises an inlet and an outlet extending from said sidewall of said meter body through an extension member, said inlet defining the inlet passageway and said outlet defining the outlet passageway, wherein one of said inlet and said outlet is radially spaced from other of said inlet and said outlet; and
- a connection member defined on said extension member, said connection member is defined by a threaded end.

37. A meter comprising:
- a meter body defining an inlet passageway, an outlet passageway, and a measuring chamber cavity;
- a fluid measuring chamber received within the measuring chamber cavity in fluid communication with the inlet passageway and the outlet passageway, wherein said fluid measuring chamber comprises a measuring chamber body having a measuring chamber inlet and a measuring chamber outlet, a wheel having a plurality of blades rotatably secured thereto, and a filter screen receiving said measuring chamber body;
- a fluid measuring register attached to said body and coupled to said measuring chamber;
- a plate threadably secured to said body, said plate having a surface that defines a portion of the measuring chamber cavity, wherein said plate and said fluid measuring register are spaced apart from each other along a first axis, that extends through the measuring chamber cavity, and the inlet passageway and the outlet passageway extend along a second axis transverse to the first axis; and wherein said meter body includes a top wall, a bottom, and a sidewall, wherein said fluid measuring register is attached to said top wall of said meter body, said plate is attached to said bottom of said meter body and the inlet passageway and the outlet passageway extend through said sidewall of said meter body, and wherein said meter body comprises an inlet and an outlet extending from said sidewall of said meter body through an extension member, said inlet defining the inlet passageway and said outlet defining the outlet passageway, one of said inlet and said outlet is radially spaced about the other of said inlet and said outlet; and
- a connection member defined on said extension member, wherein said connection member is defined by a threaded end, whereby axial forces are passed through said filter screen by rotating said threaded plate to adjust a sealing force applied to the filter screen so as to prevent distortion of the measuring chamber body and eliminating axial forces caused by tightening said threaded plate against said wheel having a plurality of blades attached thereto.

38. A meter comprising:
- a meter body defining an inlet passageway, an outlet passageway, and a measuring chamber cavity;
- a fluid measuring chamber received within the measuring chamber cavity in fluid communication with the inlet passageway and the outlet passageway;
- a fluid measuring register attached to said body and coupled to said measuring chamber; and
- a plate secured to said body, said plate having a surface that defines a portion of the measuring chamber cavity, wherein said plate and said fluid measuring register are spaced apart from each other along a first axis, that extends through the measuring chamber cavity, and the inlet passageway and the outlet passageway extend along a second axis transverse to the first axis, and wherein said meter body includes a top wall, a bottom, and a sidewall, wherein said fluid measuring register is attached to said top wall of said meter body, said plate is attached to said bottom of said meter body and the inlet passageway and the outlet passageway extend through said sidewall of said meter body, and wherein said meter body comprises an inlet and an outlet extending from said sidewall of said meter body through an extension member, said inlet defining the inlet passageway and said outlet defining the outlet passageway, one of said inlet and said outlet is radially spaced from other of said inlet and said outlet;

a threaded connection member defined on said extension member; and a pipe connector, said pipe connector including a pipe connector body having a pipe connector inlet passageway and a pipe connector outlet passageway, said pipe connector having an inlet end and an outlet end, said inlet end and said outlet end adapted to be connected to piping and said pipe connector having a meter body connecting end removably connected to said threaded connection member, said meter body connecting end having a pipe connector first portion and a pipe connector second portion, said pipe connector first portion adapted to be aligned with the inlet passageway of the meter body so that said pipe connector first portion is adapted to be in fluid communication with the inlet passageway of the meter body while said second portion is adapted to be aligned with the outlet passageway of the meter body, so that the meter body can be rotated about an axis relative to said pipe connector and the inlet passageway of the meter body and the outlet passageway of the meter body remain aligned with said pipe connector first portion and said pipe connector second portion.

39. A method for installing a water meter, comprising the steps of:

providing a meter having a meter body defining an inlet passageway, an outlet passageway and a measuring chamber cavity, a fluid measuring chamber received within the measuring chamber cavity in fluid communication with the inlet passageway and the outlet passageway, a fluid measuring register attached to the body and coupled to the measuring chamber, and a plate secured to the body, the plate having a surface that defines a portion of the measuring chamber cavity, wherein the meter body includes a meter inlet and a meter outlet extending from a sidewall of the meter body, the meter inlet and the meter outlet are defined by an extension member extending from the side of the meter body, one of the meter inlet and the meter outlet radially spaced about the other of the meter inlet and the meter outlet, and a threaded connection member defined on an end of the extension member;

providing a pipe connector, comprising a pipe connector body having a pipe connector inlet passageway and a pipe connector outlet passageway, said pipe connector having an inlet end and an outlet end, said inlet end and said outlet end adapted to be connected to piping and said pipe connector having a meter body connecting end adapted to removably connect to the threaded connection member, said meter body connecting end having a pipe connector first portion and a pipe connector second portion, said pipe connector first portion adapted to be aligned with the inlet passageway of the meter body so that said pipe connector first portion is adapted to be in fluid communication with the inlet passageway of the meter body while said second portion is adapted to be aligned with the outlet passageway of the meter body, so that the meter body can be rotated about an axis relative to said pipe connector and the inlet passageway of the meter body and the outlet passageway of the meter body remain aligned with said pipe connector first portion and said pipe connector second portion;

providing a two position plug threadably received by said securement member of said pipe connector, said plug having a plug body with a plug first portion and a plug second portion, said plug first portion defining a recessed flow passage and said plug second portion defining a sealing surface, said plug body defining threads, whereby when said plug body threadably engages with said securement member in the first position, said plug first portion recessed flow passage is in fluid communication with said pipe connector inlet passageway and said pipe connector outlet passageway and when said plug body threadably engages with said securement member in the second position, said sealing surface engages with said connector first portion and said connector second portion to fluidly seal said pipe connector inlet passageway from said pipe connector outlet passageway, attaching the pipe connector to a water line;

attaching said pipe connector pipe inlet passageway and pipe outlet passageway to a water line;

attaching said two position plug to said pipe connector in the first position so that water may pass through said pipe connector;

passing water through the pipe connector for a period of time;

reversing the position of the two position plug to the second position so that water cannot pass through said pipe connector; and replacing said two position plug with said water meter after a period of time.

* * * * *

UNITED STATES PATENT AND TRADEMARK OFFICE
CERTIFICATE OF CORRECTION

PATENT NO. : 6,178,816 B1
DATED : January 30, 2001
INVENTOR(S) : Oded Katzman and Moshe Dror It is certified that error appears in the above-identified patent and that said Letters Patent is hereby corrected as shown below:

Column 11, claim 20,
Line 51, "surface of said" should read -- surface, said --.

Signed and Sealed this

Eighteenth Day of December, 2001

Attest:

JAMES E. ROGAN
*Attesting Officer*   *Director of the United States Patent and Trademark Office*